United States Patent [19]

Jabbarnezhad

[11] Patent Number: 5,930,333
[45] Date of Patent: *Jul. 27, 1999

[54] METHOD AND SYSTEM FOR PROJECTING SERVICE AVAILABILITY IN A TELECOMMUNICATIONS SYSTEM

[75] Inventor: Javid Jabbarnezhad, Parker, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/710,915

[22] Filed: Sep. 24, 1996

[51] Int. Cl.$^6$ .............................. H04M 1/24; H04M 3/08; H04M 3/22
[52] U.S. Cl. .................................. 379/14; 379/1; 379/9; 379/32; 379/34
[58] Field of Search .................................. 379/1, 2, 9, 10, 379/14, 15, 24, 32, 33, 34, 22, 25

[56] References Cited

U.S. PATENT DOCUMENTS

| | | | |
|---|---|---|---|
| 5,488,715 | 1/1996 | Wainwright | 395/182.02 |
| 5,513,171 | 4/1996 | Ludwicwak et al. | 379/14 |
| 5,699,403 | 12/1997 | Ronnen | 379/32 |

OTHER PUBLICATIONS

Digital Networks, Error Performance Parameters and Objectives for International, Constant Bit Rate Digital Paths At or Above the Primary Rate, ITU–T Recommendation G.826 (Telecommunication Standardization Sector of International Telecommunications Union, Nov. 1993).

Maintenance, International Transport Network, Performance Limits for Bringing Into–Service and Maintenance of International PDH Paths, Sections and Transmission Systems, ITU–T Recommendation M.2100 (Telecommunication Standardization Sector of International Telecommunication Union, Jul. 1995).

*Primary Examiner*—Paul Loomis
*Assistant Examiner*—Binh K. Tieu

[57] ABSTRACT

A system and method for projecting service availability in a telecommunication network. The present invention comprises an empirically-based availability estimate that accounts for the impact of maintenance actions by network personnel, as well as cable cuts and equipment failures. The system comprises a managed network comprising a plurality of interconnected switches to carry and route telecommunications traffic among customer endpoints, a network management system connected to the interconnected switches in the managed network via control links to monitor the switching activity of said managed network, a plurality of databases for storing maintenance actions and reliability factors, and a projected availability processor connected to the network management system to collect information from the network management system and the databases and determine service availability. The system also includes a workstation connected to the projected availability processor for updating information contained in the databases. Upon receiving an availability projection request for a portion of the network, the system compiles the trouble records and SONET ring data applicable to that portion of the network for which the availability projection request was made. The system then determines empirical availability factors, such as the average frequency and duration of interruptions due to actions by network personnel. The empirical availability factors are combined with accepted reliability factors to obtain a realistic availability projection.

11 Claims, 7 Drawing Sheets

METHOD AND SYSTEM FOR PROJECTING SERVICE AVAILABILITY IN A TELECOMMUNICATIONS SYSTEM

BACKGROUND OF THE INVENTION

1. Field of the Invention

The present invention relates generally to telecommunication networks, and more particularly to a system and method for evaluating and expressing availability of a telecommunication network.

2. Related Art

Among providers of telecommunication network services, the term "availability" refers to the proportion of time that a given customer will be able to use a particular service or connection. Annually observed empirical availability may be somewhat less than 100% due to simultaneous equipment failures, natural events, accidental damage, and the like.

The commonly accepted way of evaluating and expressing availability is described in ITU standards M2100 and G.826. When a network service provider quotes an availability figure to an existing or prospective customer, the provider identifies the types of links that will serve the customer, such as radio, cable, fiber, satellite, etc., and the length of each type of link. Then the provider multiplies these parameters by commonly agreed upon factors that rate the likelihood of failure for a given type and length of a communications link. Thus, the service provider finally arrives at an estimated availability percentage that takes into account equipment failures and cable damage or link outages. This commonly used method of determining availability implies that a spare path is always available without any restrictions or conditions for backup procedures.

In practice, there is another significant factor that can degrade the actual availability experienced by a customer over a period of time. This additional factor is introduced as network maintenance personnel carry out repairs, retrofits, tests, add-ons, moves, and changes within the network that temporarily render some links unusable. Of course every effort is made to avoid interrupting a working link as this can be costly and troublesome for both the service provider and customer. Planned maintenance actions try to make judicious use of spare links that are otherwise used only in the event of failed network elements. Maintenance personnel will usually divert live traffic from a working link onto a spare link in order to perform actions on the working link. Sometimes a spare link itself may be disabled for a time as changes are made. A problem arises when a spare link is occupied or disabled at the same time when a random failure occurs in the network or a manual switchover is mistakenly triggered. This coincidence can cause interruption of service.

What is needed is a method for quantifying and expressing availability that takes into account the impact of maintenance actions by network personnel. More specifically, what is needed is a system and method for monitoring the frequency and duration of maintenance actions within an actual network over a period of time, characterizing the average impact of such actions, and, upon request, deriving an empirically-based availability estimate applicable to a specific customer or portion of the network.

SUMMARY OF THE INVENTION

Briefly stated, the present invention is directed to a system and method for projecting service availability in a telecommunication network. The present invention quantifies and expresses an empirically-based availability estimate applicable to a specific customer or portion of the network that accounts for the impact of maintenance actions by network personnel. The system comprises a managed network comprising a plurality of interconnected switches to carry and route telecommunications traffic among customer endpoints, a network management system connected to the interconnected switches in the managed network via control links to monitor the switching activity of the managed network, including the frequency and duration of maintenance actions within the managed network over a period of time, a plurality of databases for storing maintenance actions and reliability factors, storage means for storing the databases, and a projected availability processor connected to the network management system to collect information from the network management system and the databases and determine service availability, taking into account the impact of maintenance actions by network personnel. The system also includes a workstation connected to the projected availability processor to allow a user to update information contained in the databases. The network management system further comprises a trouble management system to record maintenance actions for the managed network in a trouble ticket record database.

The system records the trouble tickets from maintenance actions to document the impact on actual network availability. Upon receiving an availability projection request for a portion of the network, the system compiles the trouble records and SONET ring data applicable to that portion of the network for which the availability projection request was made. The trouble records include information on cable cuts, equipment failures, and frequency and duration of spare unavailability during maintenance actions resulting in moves, adds, and changes. The SONET ring data includes information on SONET ring architecture as well as frequency and duration of unavailability during maintenance actions resulting in moves, adds, and changes. The system then determines empirical availability factors, such as the average frequency and duration of interruptions due to actions by network personnel. The empirical availability factors are combined with accepted reliability factors to obtain a realistic availability projection based on historical maintenance activities. The system also maintains a planned actions database to compute a projected availability based on planned actions for that portion of the network. The system computes the average frequency and duration of interruptions based on planned actions and combines this with accepted reliability factors to obtain a realistic availability projection based on planned maintenance activities.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is a system and method for projecting, service availability in a telecommunications network. The present invention takes into account the impact of maintenance activities by network personnel which may contribute substantially to degraded availability in a real network. The present invention accomplishes this by monitoring the frequency and duration of maintenance actions within an actual network over a period of time, characterizing the average impact of such actions, and deriving an empirically-based availability estimate applicable to a specific customer or portion of the network.

Figure 1:
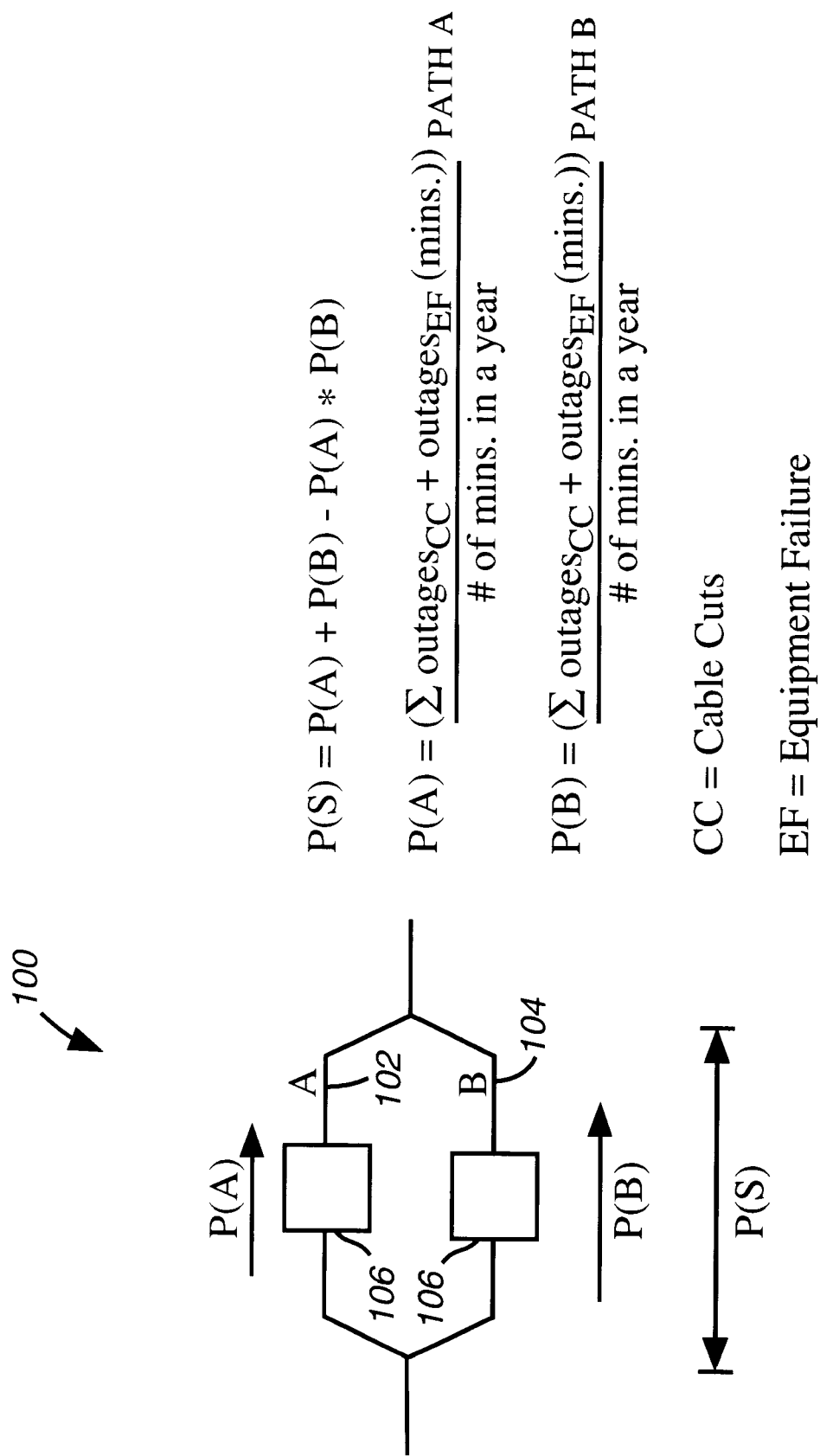
FIG. 1 illustrates a simplified telecommunications link representing a conventional method for determining availability.

A simplified linear model of a telecommunication link 100 is shown in FIG. 1. The telecommunication link 100 comprises a working, path A 102, a redundant path B 104, and telecommunication equipment 106, such as switches, multiplexers, SONET rings, etc. The conventional method for computing the availability for the telecommunication link 100 consists of accounting for minutes of outage due to cable cuts and equipment failures in working path A 102 and redundant path B 104 as follows:

$$\text{System Availability} = P(S) = P(A) + P(B) - P(A) * P(B) \qquad (1)$$

where:

$$P(A) = \text{path } A \text{ availability} = \qquad (2)$$
$$\left(\sum (\text{outages}_{CC} + \text{outages}_{EF})_{pathA}\right) / (\text{number of minutes in a year});$$

$$P(B) = \text{path } B \text{ availability} = \qquad (3)$$
$$\left(\sum (\text{outages}_{CC} + \text{outages}_{EF})_{pathB}\right) / (\text{number of minutes in a year});$$

Thus, both P(A) and P(B) are computed as the ratio of the summation of all outage in minutes to the total minutes in a year. The outage in minutes consists of cable cuts (CC) and equipment failure (EF). The availability for both cable cuts and equipment failure is computed as follows:

$$\text{Availability for Equipment} = MTBF/(MTBF+MTTR) \qquad (4)$$

where:

$$MTBF = \text{Mean Time Between Failures} = C/\text{vendor FIT}; \qquad (5)$$

$$MTTR = \text{Mean Time To Repair; and } C = \text{constant} = 1000000000.$$

Use of the above equations ((1) through (5)) implies that path A 102 or path B 104 should always be available without any restriction or condition as backup.

In the real world, path A 102 or path B 104 is not always available. As network maintenance personnel carry out repairs, retrofits, tests, add-ons, moves, and changes within the network, some links may temporarily be rendered unusable. Maintenance personnel make every effort to divert live traffic from a working link onto a spare link in order to perform such actions on a working link, but there are times when a spare link may be disabled for a time as such actions are being performed. A problem arises when a spare link is occupied or disabled at the same time a random failure occurs in the network or a manual switchover is mistakenly triggered.

To account for such real world situations, an interruption factor has been added to the conventional method of computing availability. The interruption factor takes into account the amount of time a spare path is unavailable due to interruptions of add-ons, moves, and changes beyond cable cuts and equipment failures to form a more accurate estimate of availability.

The computation of system availability is modified in equations (2) and (3) to include an interruption factor, I(f,t). I(f,t) is a function of the amount of times that the redundant or spare path B 104 is not available as a temporary replacement for the working path A 102 and the length of time the redundant or spare path B 104 is unavailable. In other words, I(f,t) is a function of the frequency and duration of redundant path B being unavailable. Thus, P(A) and P(B) are equivalent to:

$$P(A) = (\Sigma \text{outages}_{CC} + \text{outages}_{EF} + I(f,t))_{pathA}/(\text{number of minutes in a year}); \qquad (6)$$

and $$P(B) = (\Sigma \text{outages}_{CC} + \text{outages}_{EF} + I(f,t))_{pathB}/(\text{number of minutes in a year}). \qquad (7)$$

When SONET ring architecture appears within a telecommunication link, the interruption factor may have a different impact. SONET (synchronous optical network) is an international standard for broadband transmission through fiber optic cables and is well known to persons in the relevant art(s). The impact of interruption factor on a SONET ring is related to the number of fiber optic links in the SONET ring. The greater the number of fiber optic links, the lower the probability of outage. A lower number of fiber optic links results in an increase in the probability of outage. In a two fiber-optic link SONET ring, availability is highly dependent on the interruption factor. This is due to the inherent deficiency or inability of this architecture to adhere to normal maintenance operations resulting in adds, moves, and changes. This inability is identified and accounted for by using the interruption factor in series with the equipment and cable cut availability. In a four fiber-optic link SONET ring, the interruption factor effect is not as significant due to the inherent ability of this architecture to adhere to normal maintenance operations resulting in adds, moves, and changes.

Figure 2:
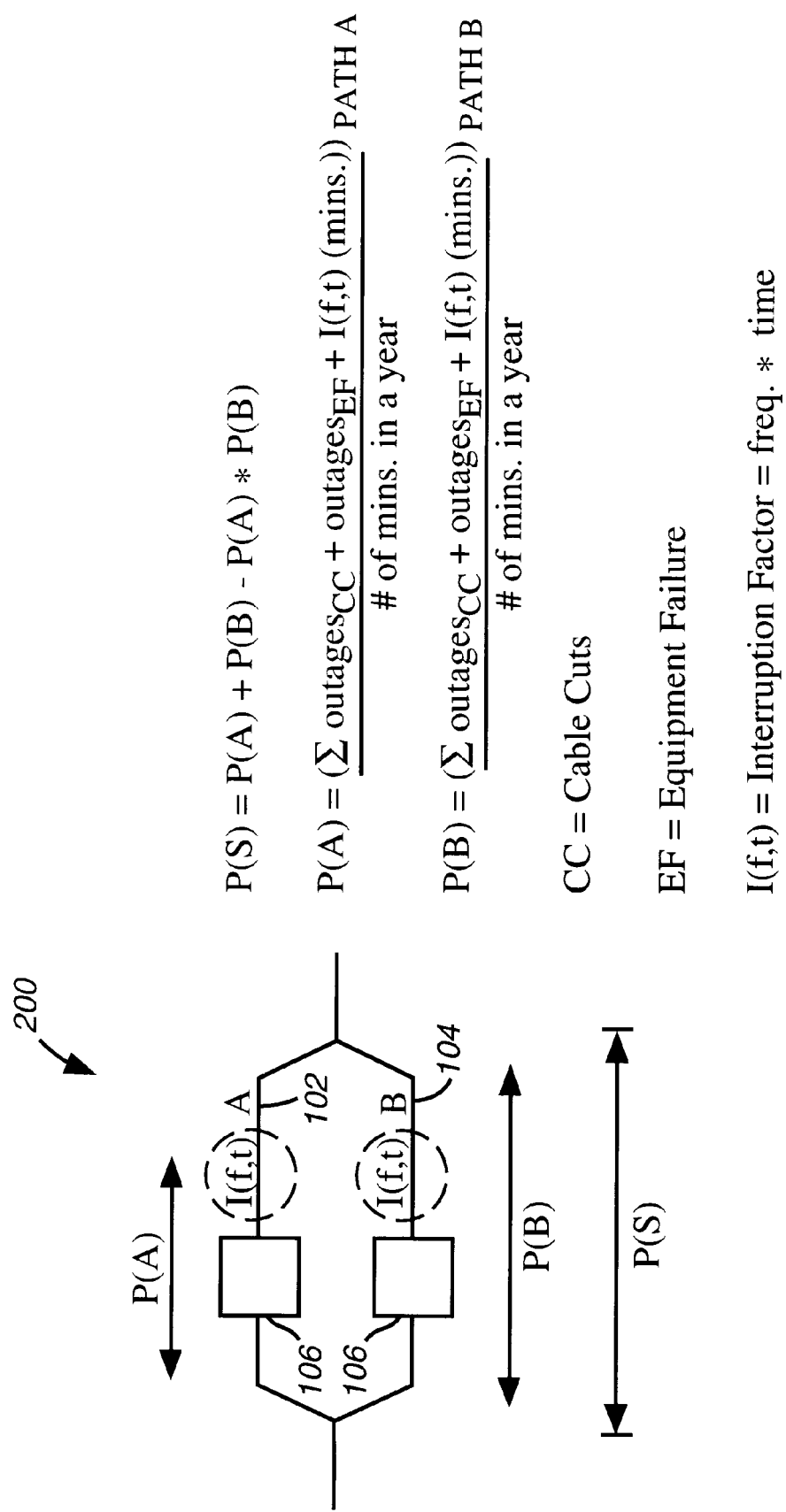
FIG. 2 illustrates a simplified telecommunications link representing a method for determining availability based on interruption factor.

FIG. 2 represents a model for determining interruption factor on a communication link 200 comprising a four fiber-optic link SONET ring. For each path in the telecommunication link, interruption factor 202 is shown in parallel. Therefore, the calculation of availability for a four fiber-optic link SONET ring is equivalent to P(A) and P(B) as shown in equations (6) and (7).

Figure 3:
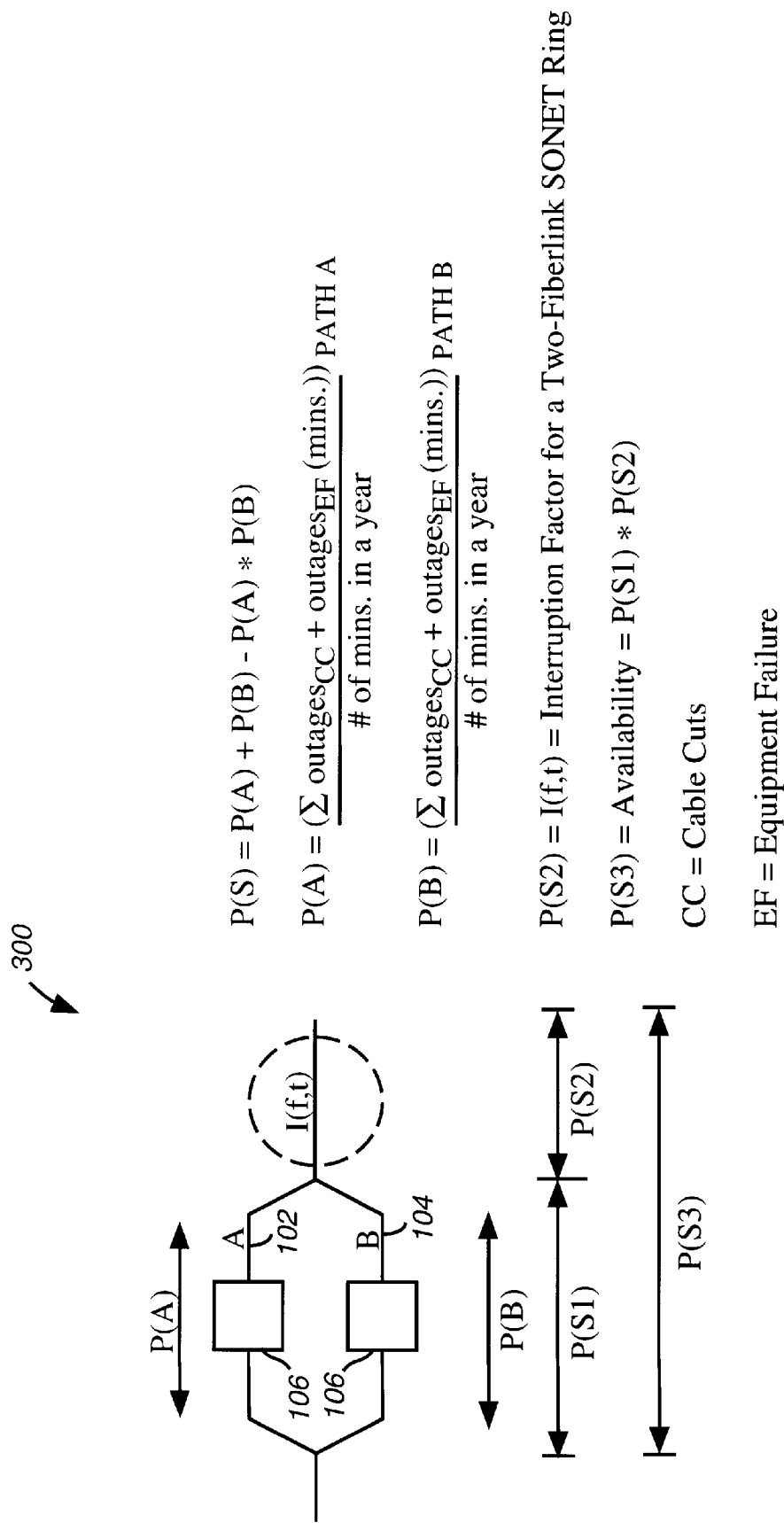
FIG. 3 illustrates a simplified telecommunications link comprising a two-fiberlink SONET ring representing a method for determining availability based on interruption factor.

FIG. 3 represents a model for determining interruption factor on a communication link 300 comprising a two fiber-optic link SONET ring. To account for less fiber-optic links (or spare paths) and the unavailability of the two fiber-optic link SONET ring to adhere to adds, moves, and changes during maintenance operations, the model determines interruption factor for the two fiber-optic SONET ring in series with both paths A 102 and B 104. Thus, availability for the telecommunication link 300 is as follows:

$$P(S1)=P(A)+P(B)-P(A)*P(B) \qquad (8)$$

where:

$$P(A)=(\Sigma(\text{outages}_{CC}+\text{outages}_{EF})_{pathA})/(\text{number of minutes in a year}); \qquad (2)$$

$$P(B)=(\Sigma(\text{outages}_{CC}+\text{outages}_{EF})_{pathB})/(\text{number of minutes in a year}); \qquad (3)$$

$$P(S2)=I(f,t)=\text{frequency*duration (for a two fiber-optic link SONET ring)} \qquad (9)$$

and $$\text{Availability}=P(S3)=P(S1)*P(S2). \qquad (10)$$

Note that when determining outages for a SONET ring, one must take into account the outages in minutes incurred around the entire ring.

Figure 4:
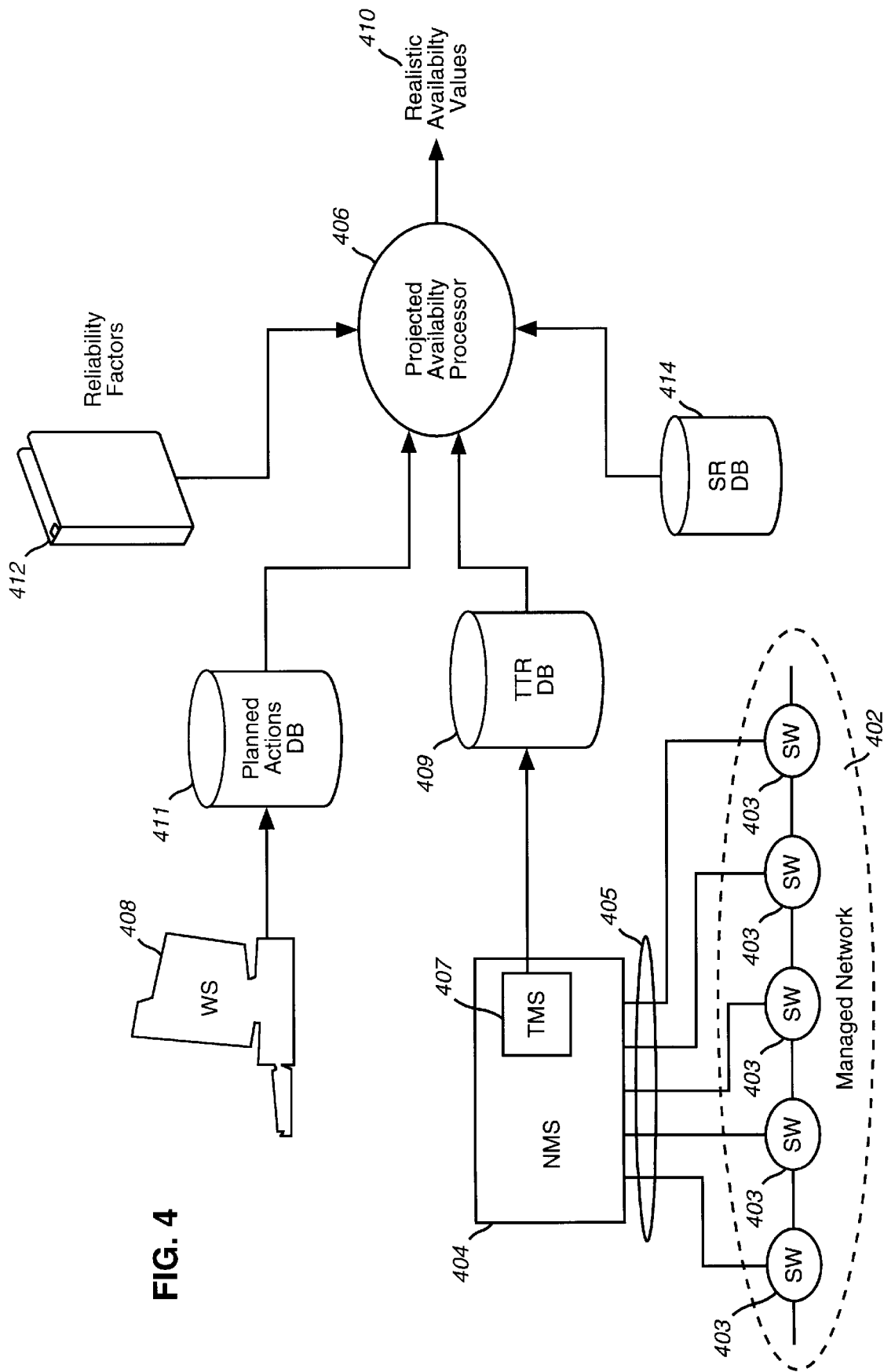
FIG. 4 illustrates a preferred embodiment of the present invention.

As previously stated, the present invention is a system and method for projecting service availability in a telecommunication network that incorporates the impact of maintenance actions by network personnel. A preferred embodiment of the present invention is shown in FIG. 4. The system comprises a managed network 402, a network management system (NMS) 404, a projected availability processor 406, and a workstation 408. The managed network 402 comprises a multitude of interconnected switches 403 and other network elements (not shown). The interconnected switches 403 carry and route telecommunications traffic among customer endpoints. Each interconnected switch 403 is also connected to the network management system 404 through control links 405. The control links 405 carry control information to the interconnected switches 403 and status notification signals from the interconnected switches 403.

The NMS 404 includes a trouble management system (TMS) 407 to record trouble tickets and monitor the switching activity of the managed network 402. The trouble tickets include information on cable cuts, equipment failures, and frequency and duration of spare unavailability during moves, adds, and changes. Alarm information associated with maintenance actions is also monitored by the trouble management system 407. These records are accumulated in a trouble ticket record (TTR) database 409.

A workstation 408 is used to update a planned actions database 411 with information about adds, moves, and changes that are anticipated to affect the managed network 402 in the foreseeable future. For example, a planned build-out or retrofit to the network may require an entire sequence of well-coordinated switchovers that each temporarily weaken the restorability of the network.

The projected availability processor 406 collects information from the TTR database 409, the planned actions database 411, and a SONET ring (SR) database 414 and computes availability, using the equations, previously defined, that incorporate interruption factor, to derive a realistic availability estimate for various telecommunication network configurations. The SONET ring database 414 contains information on the various SONET ring architecture found in the managed network 402, such as data on the circumference of the SONET rings, the nodes comprising the SONET ring, the distance between nodes, and the type of SONET ring (i.e., 2-fiber or 4-fiber). Documented reliability factors 412 are also input into the projected availability processor 406. These reliability factors 412 are either well known and accepted standard values in the industry or are at least agreed upon between service provider and customer. These inputs relate to the frequency and duration of failures among components within the managed network 402.

Figure 5:
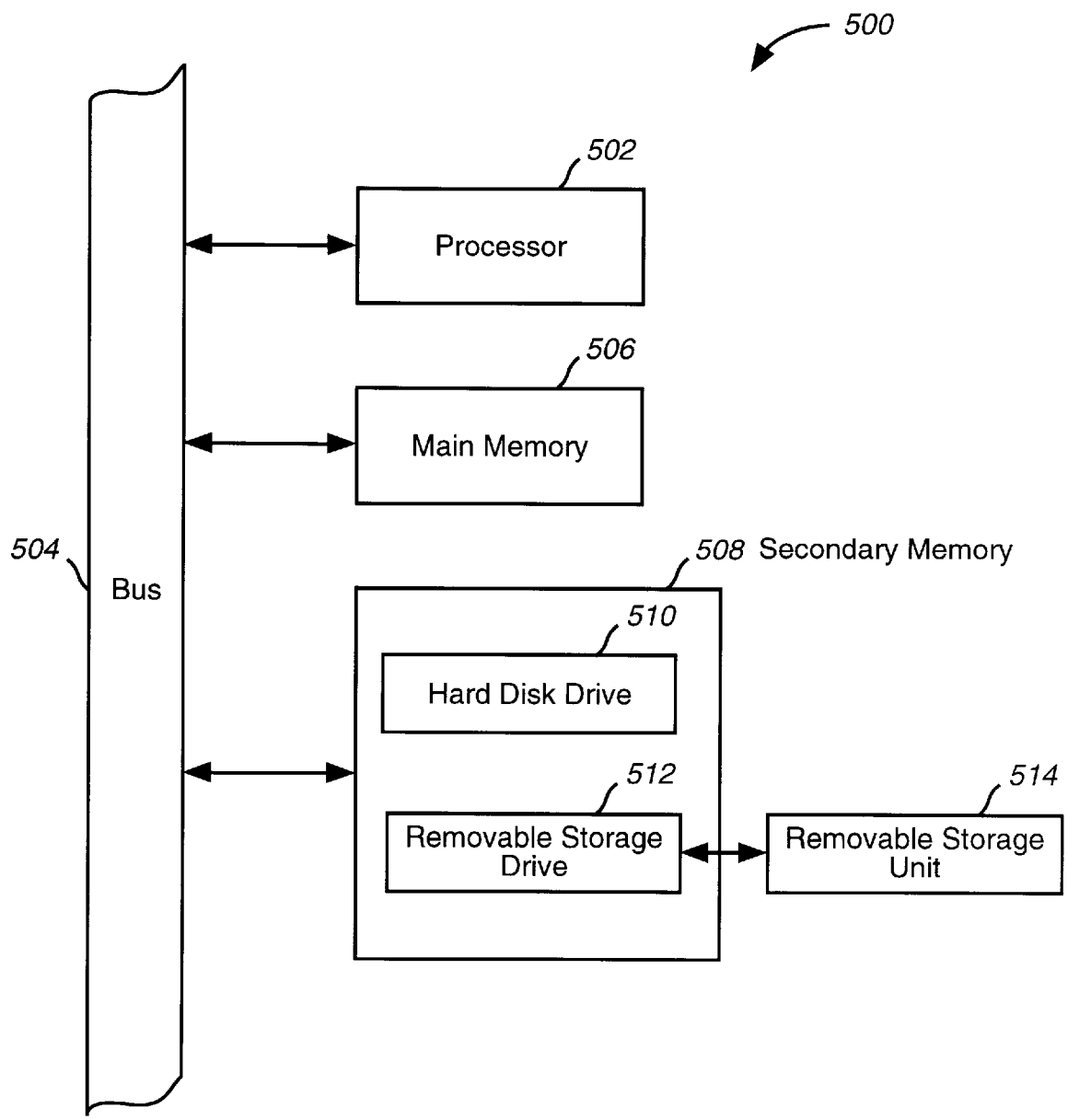
FIG. 5 illustrates an exemplary computer system to which the present invention is directed.

The SR database 414, the planned actions database 411, the reliability factors 412, and the projected availability processor 406 can be implemented, at least partially, using a computer system, such as the computer system 500 shown in FIG. 5. This computer system 500 can also be used to implement the Network Management System 404 with its associated TTR database 409. Alternatively, the Network Management System 404 and the TTR database 409 can be implemented using a separate computer system, such as the computer system 500 shown in FIG. 5.

The computer system 500 includes one or more processors, such as processor 502. The processor 502 is connected to a communication bus 504.

The computer system 500 also includes a main memory 506, preferably random access memory (RAM), and a secondary memory 508. The secondary memory 508 includes, for example, a hard disk drive 510 and/or a removable storage drive 512, representing a floppy disk drive, a magnetic tape drive, a compact disk drive, etc. The removable storage drive 512 reads from and/or writes to a removable storage unit 514 in a well known manner.

Removable storage unit 514, also called a program storage device or a computer program product, represents a floppy disk, magnetic tape, compact disk, etc. The removable storage unit 514 includes a computer usable storage medium having stored therein computer software and/or data.

Computer programs (also called computer control logic) are stored in main memory and/or the secondary memory 508. Such computer programs, when executed, enable the computer system 500 to perform the features of the present invention as discussed herein. In particular, the computer programs, when executed, enable the processor 502 to perform the features of the present invention. Accordingly, such computer programs represent controllers of the computer system 500.

In another embodiment, the invention is directed to a computer program product comprising a computer readable medium having control logic (computer software) stored therein. The control logic, when executed by the processor 502, causes the processor 502 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

Figure 6:
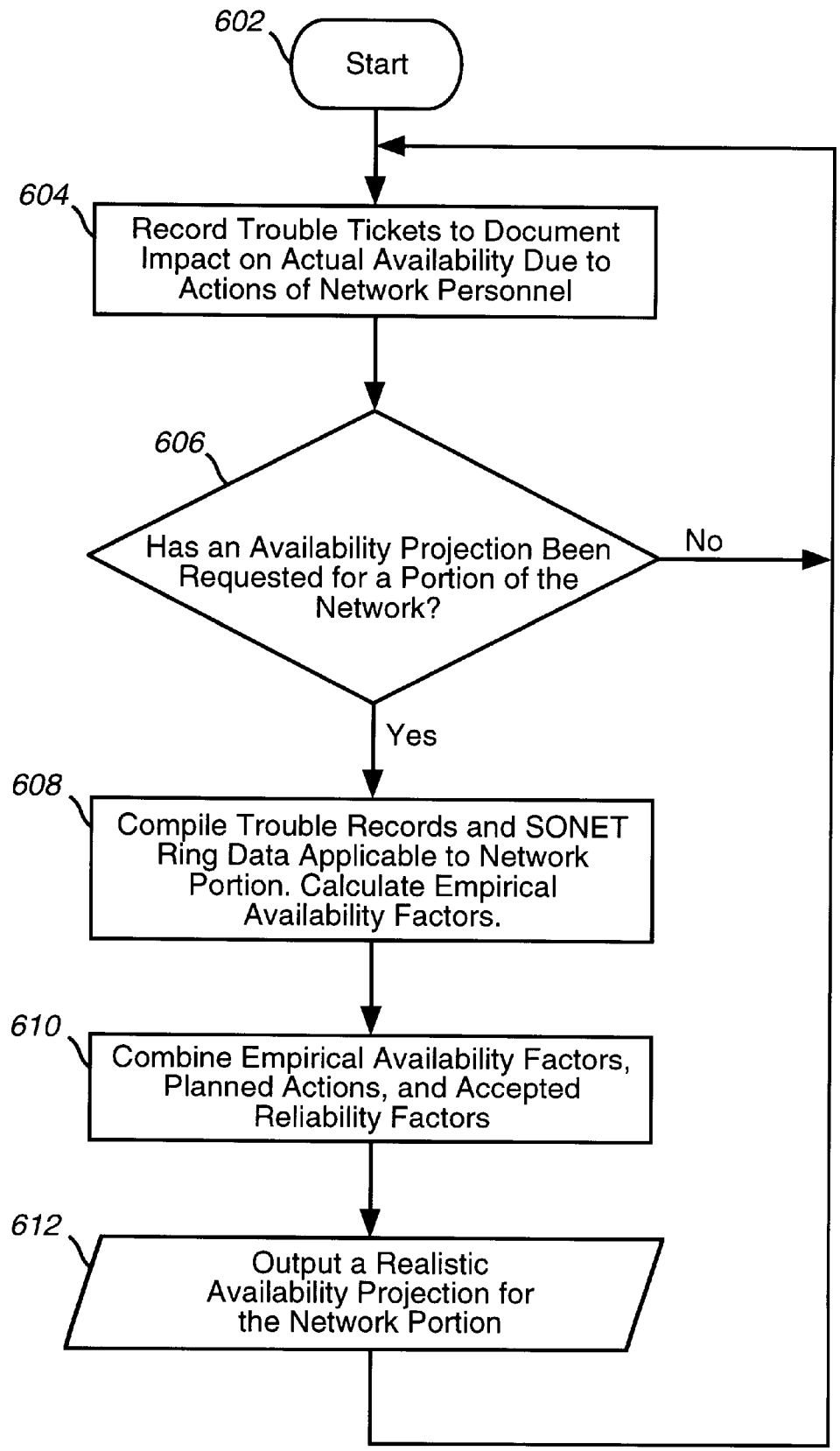
FIG. 6 illustrates a method for using the present invention.

The overall system process 600 is described in FIG. 6. The system process 600 starts in step 602. The start of step 602 corresponds to the time when the TMS 407 begins observing the network and storing trouble ticket records in the TTR database 409. In step 604 ongoing trouble tickets are collected and the associated frequency and duration of link unavailability is monitored.

In a decision step 606, it is determined whether an availability projection has been requested for a portion of the network. If a request for an availability projection was made, for example, by a network design engineer, processing continues to step 608. In step 608, selected trouble records are retrieved from the TTR database 409. In a preferred embodiment, the records chosen are those applicable to the same or similar portions of the managed network 402 to which the request is related and those that relate to a span of time, such as one year, prior to the time of the request. If SONET rings are incorporated in that portion of the managed network 402 to which the request is related, data corresponding to the appropriate SONET ring architecture is also chosen from the SONET ring database 414. Step 608 also includes the calculation of empirical availability factors that characterize the recent effects of maintenance actions on availability utilizing the data from the TTR database 409 and the SR database 414.

In step 610 maintenance-related availability factors derived from step 608 are combined with the planned actions from the planned action database 411 and the reliability factors 412 to compute a realistic availability value that takes into account maintenance actions from adds, moves, and changes. The result is output in step 612. Processing then continues back to step 604 where trouble tickets are recorded until another availability projection request is received.

Returning to decision step 606, if no request for availability projections is received, processing continues back to step 604 where trouble tickets are recorded until an availability projection request is received.

Figure 7:
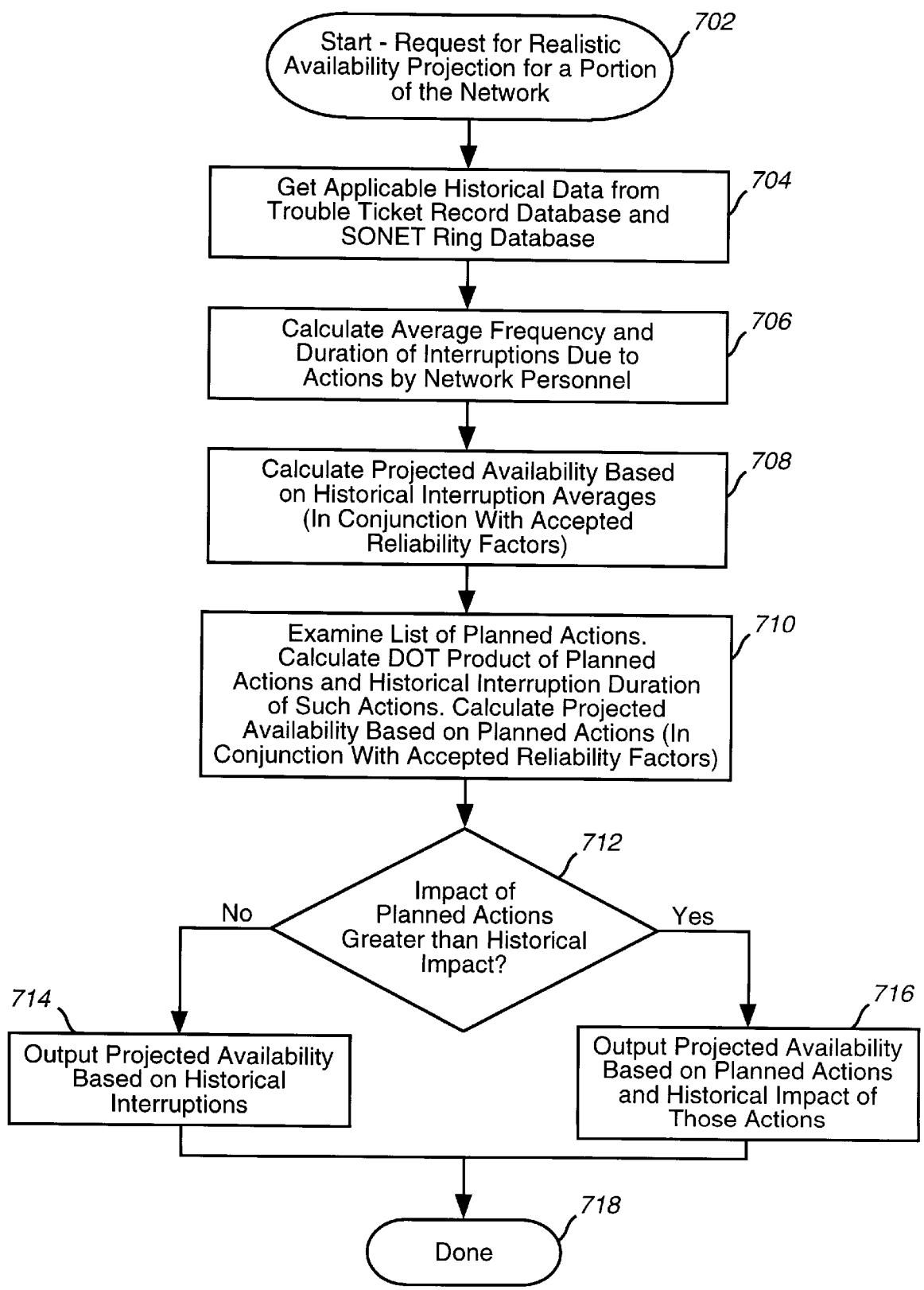
FIG. 7 illustrates a detailed flow diagram for performing an availability projection that incorporates interruption factor.

FIG. 7 represents a more detailed description of steps 608 and 610 where the availability projection applicable to a particular portion of the managed network 402 is determined. Step 702 indicates the receipt of a request for an availability projection applicable to a particular portion of the managed network 402. This portion may be an actual segment of the managed network 402, the entire managed network 402, or a path through the managed network 402 applicable to a specific customer.

In step 704 a search of all records in the TTR database 409 and the SR database 414 that pertain to the present request are retrieved. A mathematical calculation to arrive at an average frequency and duration (or similar characterization) that summarizes the observed effects of previous maintenance actions upon that portion of the managed network 402 for which the availability projection request was made is obtained using the pertinent TTRs retrieved from the TTR database 409 and the pertinent SRs retrieved from the SR database 414 in step 706.

In step 708, one availability projection is prepared under the assumption that recently observed maintenance actions will continue to occur at approximately the same rate in the foreseeable future. The historical averages created in step 706 are combined with the accepted reliability figures for network elements using probability mathematics to arrive at a projected availability. Such probability mathematics are well known to persons skilled in the relevant art(s).

In step 710, an alternate availability projection is prepared based upon knowledge of the planned actions that are indicated in database 411. The availability impact of each planned action is estimated by using the historical data from step 706 for the average duration related to that type of action. These estimates are then combined with the reliability figures to arrive at an alternate projected availability based on known future actions.

In decision step 712, a comparison is made between the availability projections derived in steps 708 and 710. If the purely extrapolative estimate of step 708 is a lower percentage value than the planning-based estimate from step 710, then step 714 outputs the projection from step 708 to the requestor. Otherwise, step 716 outputs to the requestor the value from step 710. In an alternate embodiment, the system outputs availability projections based on both historical and planned actions. Thus, if a significant increase in maintenance actions is foreseen, then a reasonable availability projection can be provided that takes this factor into account. Even with thoroughly planned actions, the empirical observations are still useful for characterizing duration. The availability projection process ends in step 718.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for projecting service availability in a telecommunication network, comprising the steps of:
    (1) recording trouble tickets to document impact on actual availability due to actions of network personnel until an availability projection request for a portion of the network has been made;
    (2) compiling said trouble records and SONET ring data applicable to said portion of the network for which said availability projection request was made;
    (3) determining empirical availability factors accounting for outages due to at least one of a cable cut, an equipment failure, and an interruption factor;
    (4) combining empirical availability factors, planned actions, and accepted reliability factors to obtain a realistic availability projection for said network portion, wherein said realistic availability projection is based on one of historical interruption averages in conjunction with accepted reliability factors and planned actions in conjunction with accepted reliability factors.

2. The method of claim 1, wherein said interruption factor comprises the step of determining average frequency and duration of interruptions when a redundant path is not available as a temporary replacement for a working path.

3. The method of claim 1, wherein step (4) further comprises the steps of:
    determining projected availability based on historical interruption averages in conjunction with accepted reliability factors;
    getting applicable planned actions;
    determining frequency and interruption duration for said applicable planned actions;
    determining projected availability based on planned actions in conjunction with accepted reliability factor;
    outputting projected availability based on historical interruptions, if impact of historical interruptions greater than impact of planned actions; and
    outputting projected availability based on said planned actions and the historical impact of said planned actions, if impact of planned actions greater than impact of historical interruptions.

4. A system for projecting service availability in a telecommunications network, the system comprising:
    means for recording trouble tickets to document impact on actual availability due to actions of network personnel until an availability projection request for a portion of the network has been made;
    means for compiling said trouble records and SONET ring data applicable to said portion of the network for which said availability projection request was made;

means for determining empirical availability factors accounting for outages due to at least one of a cable cut, an equipment failure, and an interruption factor; and means for combining empirical availability factors, planned actions, and accepted reliability factors to obtain a realistic availability projection for said network portion, wherein said realistic availability protection is based on one of historical interruption averages in conjunction with accepted reliability factors and planned actions in conjunction with accepted reliability factors.

5. The system of claim 4, wherein said interruption factor comprises means for determining average frequency and duration of interruptions when a redundant path is not available as a temporary replacement for a working path.

6. The system of claim 4, further comprising:

means for determining projected availability based on historical interruption averages in conjunction with accepted reliability factors;

means for gathering applicable planned actions;

means for determining frequency and interruption duration for said applicable planned actions;

means for determining projected availability based on planned actions in conjunction with accepted reliability factor;

means for outputting projected availability based on historical interruptions, if impact of historical interruptions greater than impact of planned actions; and means for outputting projected availability based on said planned actions and the historical impact of said planned actions, if impact of planned actions greater than impact of historical interruptions.

7. A system for projecting service availability in a telecommunication network, the system comprising:

a managed network, said managed network comprising a multitude of interconnected switches to carry and route telecommunications traffic among customer endpoints;

a network management system connected to said interconnected switches in said managed network via control links, wherein said network management system monitors the switching activity of said managed network;

a plurality of databases, wherein each of said databases stores one of maintenance actions and reliability factors;

storage means for storing said plurality of databases;

a projected availability processor connected to said network management system, wherein said projected availability processor collects information from said network management system and said plurality of databases and determines service availability estimates, applicable to a specific customer and portion of the network, that accounts for outages due to at least one of a cable cut, an equipment failure, and an interruption factor, said service availability estimates are based on one of historical interruption averages in conjunction with accepted reliability factors and planned actions in conjunction with accepted reliability factors; and a workstation connected to said projected availability processor, whereby said workstation allows a user to update said plurality of databases.

8. The system of claim 7, wherein said network management system further comprises a trouble management system, wherein said trouble management system records maintenance actions for said managed network in a trouble ticket record database.

9. A computer program product comprising a computer useable medium having computer program logic recorded thereon for enabling a processor in a computer system to compute projected service availability based on maintenance actions for a managed network, said computer program logic comprising:

means to enable said processor to record trouble tickets to document impact on actual availability due to actions of network personnel until an availability projection request for a portion of the network has been made;

means to enable said processor to compile said trouble records and SONET ring data applicable to said portion of the network for which said availability projection request was made;

means to enable said processor to determine empirical availability factors accounting for outages due to at least one of a cable cut, and equipment failure, and an interruption factor; and means to enable said processor to combine empirical availability factors, planned actions, and accepted reliability factors to obtain a realistic availability projection for said network portion, wherein said realistic availability projection is based on one of historical interruption averages in conjunction with accepted reliability factors and planned actions in conjunction with accepted reliability factors.

10. The computer program product of claim 9, wherein said interruption factor comprises means to enable said processor to determine average frequency and duration of interruptions when a redundant path is not available as a temporary replacement for a working path.

11. The computer program product of claim 10, further comprising:

means to enable said processor to determine projected availability based on historical interruption averages in conjunction with accepted reliability factors;

means to enable said processor to gather applicable planned actions;

means to enable said processor to determine frequency and interruption duration for said applicable planned actions;

means for determining projected availability based on planned actions in conjunction with accepted reliability factor;

means to enable said processor to output projected availability based on historical interruptions, if impact of historical interruptions greater than impact of planned actions; and means to enable said processor to output projected availability based on said planned actions and the historical impact of said planned actions, if impact of planned actions greater than impact of historical interruptions.

* * * * *